United States Patent
Wright et al.

(10) Patent No.: US 7,139,776 B2
(45) Date of Patent: Nov. 21, 2006

(54) SYSTEMS AND METHODS FOR FACILITATING INFORMATION RETRIEVAL IN A TELECOMMUNICATIONS ENVIRONMENT

(75) Inventors: Robert Hollis Wright, Ramsey, IN (US); Charles Emil Raymond, Louisville, KY (US); Terry D. Thacker, Lawrenceburg, KY (US)

(73) Assignee: BellSouth Intellectual Property Corporation, Wilmington, DE (US)

( * ) Notice: Subject to any disclaimer, the term of this patent is extended or adjusted under 35 U.S.C. 154(b) by 482 days.

(21) Appl. No.: 10/353,565

(22) Filed: Jan. 29, 2003

(65) Prior Publication Data

US 2004/0148314 A1    Jul. 29, 2004

(51) Int. Cl.
*G06F 17/30* (2006.01)
(52) U.S. Cl. .................. 707/104.1; 707/3; 707/10; 707/101; 707/102; 709/201; 709/203; 714/1; 715/530
(58) Field of Classification Search .................. 707/10, 707/100, 104.1, 3, 101, 102; 709/206, 225, 709/226, 227, 201, 203; 714/1; 379/67.1, 379/201.05, 201.02; 704/275; 705/9, 37, 705/38; 715/512, 513, 526, 530
See application file for complete search history.

(56) References Cited

U.S. PATENT DOCUMENTS

| | | | |
|---|---|---|---|
| 5,559,877 A * | 9/1996 | Ash et al. ............... | 379/201.05 |
| 5,862,325 A * | 1/1999 | Reed et al. .................. | 709/201 |
| 6,078,924 A * | 6/2000 | Ainsbury et al. ........... | 707/101 |
| 6,088,717 A * | 7/2000 | Reed et al. .................. | 709/201 |
| 6,345,288 B1 * | 2/2002 | Reed et al. .................. | 709/201 |
| 6,708,205 B1 * | 3/2004 | Sheldon et al. ............. | 709/206 |
| 6,714,979 B1 * | 3/2004 | Brandt et al. .................. | 707/10 |
| 6,735,293 B1 * | 5/2004 | Doherty et al. ........ | 379/201.12 |
| 6,757,710 B1 * | 6/2004 | Reed ........................ | 709/203 |
| 6,763,345 B1 * | 7/2004 | Hempleman et al. .......... | 707/1 |
| 6,771,744 B1 * | 8/2004 | Smith et al. ............... | 379/67.1 |
| 2003/0055976 A1 * | 3/2003 | Hartmann et al. .......... | 709/227 |
| 2004/0158762 A1 * | 8/2004 | Abraham, Jr. .................. | 714/1 |

* cited by examiner

*Primary Examiner*—Shahid Alam
(74) *Attorney, Agent, or Firm*—Merchant & Gould

(57) ABSTRACT

A method of providing documentation from a source of telecommunications documentation. The method includes receiving a list of telecommunications work items and creating a report based on the list of work items, wherein the report includes a link to a source of telecommunications documentation associated with a work item on the list. The method also includes providing the report to a user and retrieving the documentation from the source of telecommunications documentation when the user selects the link.

20 Claims, 5 Drawing Sheets

```
FORMAT M LOC        GTAS DMC ATC      DETAILED TRUNK RECORD
DESC DF4-0AZ0TS     LOC A MDVIKYMA02T PULS M- LOC Z MDVIKYQA0MD         PROJ
GAC AF203889        OFC A TYPE DMC                 OFC Z TYPE           CLO KYM082715
END A               PROJ A       IE DATE --    PROJ Z     IE DATE --    TGN -
TOTAL 0024   WORKG 0000  IE 0000 PENDIS 0000  PENCON 0024  PENATT 0000  PENDET 0000   SPARE 0000
AC A   CLO NBR        CLO !                          TABLE: CLLI                                       TAF
                     DATE S CLLI     ADNUM TRKGRSIZ ADMNINF                     GRPTYP        TRJ
IE W                    ATXOAZOTS     426  24     AF203889_OGT_OAZOTS_MDVIQAOMD  ATC  14
CLO#                            TABLE: TRKGRP ( (ATC) CONTINUED
       TRAFCLS SELSEQ  WBSELSEQ  WBGRPING WB SEARCH PRTNM   SCRNCL SNPA STS CARRNM ANI SIGTYPE
       OA     MIDL                                          NPRT   NSCR         270    288  Y  EAPLAN

CLO#                             OPTION = VALUE
       STNCLS   OSIND                  $
       COMB     N
CLO#                                        TABLE: TRKSGRP (STD)
       SGRP CARDCODE  SIGDATA DIR IPULSTYP ISTARTSG OVLP PSPDSEIZ PARTDIAL OPULSTYP OSTARTSG IDGTI
       0  DS1SIG      STD     OG                                                            MF     WK   7
       CCONT RNGBCK ESUPR SAT REMBSY DIALMODE TRKGRDTM ECSTAT NSMATCH AUTOON FUTURE USE (2)
       NO    NO     N     N   N    Y                  100              UNEQ
CLO#                     TABLE: BRANDOPT                             !                TABLE: DATRKOPT
       ICTRKGRP  OPERSYS    NBECLOOK  GRPKEY      MULTREQ DACC INTCC BILLRQD CLGNRQD REQNE
CLO#                     TABLE: AMATKOPT                             !                TABLE: TRKOPTS
       OPTION = VALUE
CLO#                               TABLE: TOPSTOPT (CTG-TCG OBTAIN INPUT DATA FROM OPERATORE SERVICES)
       GRPKEY             ORGCRIT-SEL ORGCRIT             DISPCLG  ADASERV  ADASANS  ANI2CLI BLKCLI  OLNSQRY
CLO#
```

FIG. 4

SYSTEMS AND METHODS FOR FACILITATING INFORMATION RETRIEVAL IN A TELECOMMUNICATIONS ENVIRONMENT

BACKGROUND

The present invention is directed generally and in various embodiments to systems and methods for facilitating information retrieval in a telecommunications environment.

Telecommunications service providers often employ various software systems that allow for provisioning of various types of services. For example, a system is employed by many telecommunications service providers that assists in provisioning new circuits between telephone central offices (COs) or between telephone COs and customer provided equipment (CPE). Also, many telecommunications service providers employ a work control system that is used to automate many work assignments that are required to install and repair client facilities, trunks, special service circuits, and business and residential lines. A service (or work) order that requests the provisioning (e.g. installation, change, or disconnection) of a service is usually input into the systems to identify the service that needs provisioned, when it needs provisioned, and what action or actions must be taken to provision the service.

Oftentimes, a user of the above-described systems, such as a technician, is assigned a task that requires the user to consult information, such as a provisioning document, that is external to the systems. For example, a technician may need to consult an information source that is resident on a web page or in a paper document. In order to access such external sources, the user has to open, for example, a web browser, type in a link to the requested information, and then access the requested information.

SUMMARY

In one embodiment, the present invention is directed to a method of providing documentation from a source of telecommunications documentation. The method includes receiving a list of telecommunications work items and creating a report based on the list of work items, wherein the report includes a link to a source of telecommunications documentation associated with a work item on the list. The method also includes providing the report to a user and retrieving the documentation from the source of telecommunications documentation when the user selects the link.

In one embodiment, the present invention is directed to a system for providing documentation from a source of telecommunications documentation. The system includes a relay computer for receiving a list of work items, each work item associated with a task to be performed by a telecommunications worker, and for creating a report having a link associated with a work item from the list of work items. The system also includes a source of telecommunications documentation in communication with the relay computer and a user terminal in communication with the source of telecommunications documentation for enabling a user to select the link in order to retrieve documentation from the source of telecommunications documentation.

In one embodiment, the present invention is directed to a computer readable medium having stored thereon instructions which, when executed by a processor, cause the processor to receive a list of telecommunications work items, create a report based on the list of work items, wherein the report includes a link to a source of telecommunications documentation associated with a work item on the list, provide the report to a user, and retrieve the documentation from the source of telecommunications documentation when the user selects the link.

BRIEF DESCRIPTION OF THE DRAWINGS

Further advantages of the present invention may be better understood by referring to the following description taken in conjunction with the accompanying drawings, in which:

FIG. 4 is an example of documentation retrieved from a detailed trunk record system according to one embodiment of the present invention.

DESCRIPTION

It is to be understood that the figures and descriptions of the present invention have been simplified to illustrate elements that are relevant for a clear understanding of the present invention, while eliminating, for purposes of clarity, other elements. Those of ordinary skill in the art will recognize, however, that these and other elements may be desirable. However, because such elements are well known in the art, and because they do not facilitate a better understanding of the present invention, a discussion of such elements is not provided herein.

Figure 1:
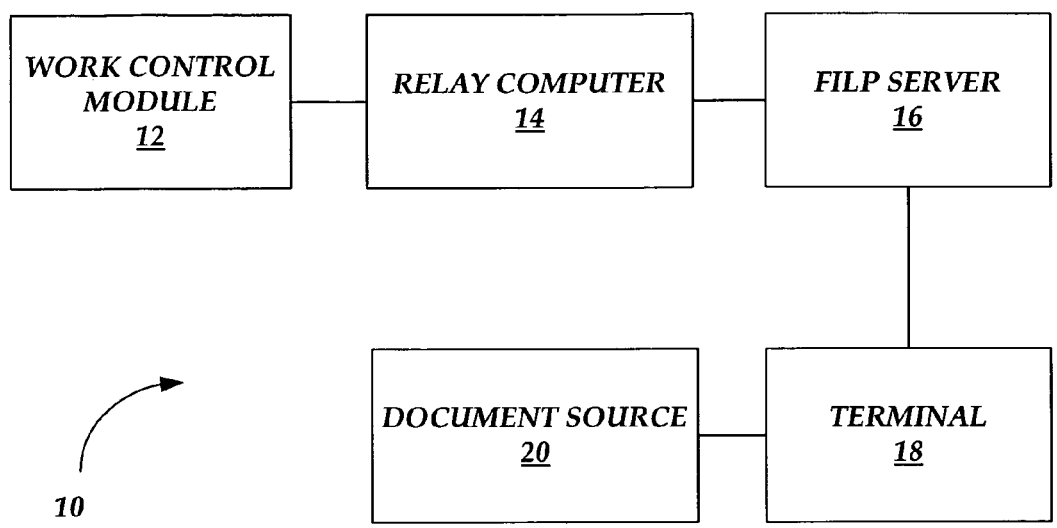
FIG. 1 is a diagram illustrating an information retrieval system according to one embodiment of the present invention.

FIG. 1 is a diagram illustrating an information retrieval system 10 according to one embodiment of the present invention. The system 10 may be used by a telecommunications service provider to assist in provisioning telecommunications services. For example, a circuit provisioning group of a telecommunications service provider could employ the system 10 to perform, among other tasks, circuit provisioning functions.

The system 10 includes a work control module 12. The module 12 may be, for example, the Work and Force Administration System (WFA) that is offered by Telcordia Technologies. The work control module 12 automates various work assignments that are required to install and repair telecommunications customer facilities, trunks, special service circuits, and business and residential lines.

The system 10 also includes a relay computer 14 that parses raw data from the work control module 12 into a report format. The relay computer 14 also creates links to supporting documentation, if necessary. For example, if the data from the work control module 12 indicate that a certain task is to be performed by a technician, the relay computer 14 performs a cross reference for that task to determine if a link to documentation, such as, for example, a provisioning document, should be included in the report. The relay computer may add a link based on, for example, the presence of certain tracking keys in the data from the work control module 12. If so, the relay computer 14 places the documentation link into the report. The link placed in the report may be, for example, a uniform resource locator (URL)

address of a documentary resource. The link may contain, for example, an order number from the work control module that is used as a document name in the documentary source. The relay computer 14 may be any type of suitable computer such as, for example, a personal computer.

The system 10 includes a file server 16. The file server 16 may be, for example, a local file server or a web server that stores reports that are formatted by the relay computer 14. The reports may be stored on, for example, a shared disk medium in the file server 16. The user may access the formatted reports in the file server 16 via a terminal 18. The terminal 18 may be any type of suitable computer such as, for example, a personal computer or a workstation that is positioned on, for example, a local area network (LAN). After the user of the system 10 accesses a report, the user may select a link that was added to the report by the relay computer 14. Upon selection of the link, the terminal 18 retrieves the documentation corresponding to the link from a document source 20. The document source 20 may be, for example, an automated routing and trunking system that stores call routing and trunking information such as, for example, the BellSouth ARTS system or may be, for example, an interconnection facility ordering system such as, for example, the BellSouth ASR system. The document source 20 may be in communication with the terminal 18 via, for example, the Internet or an intranet.

Figure 2:
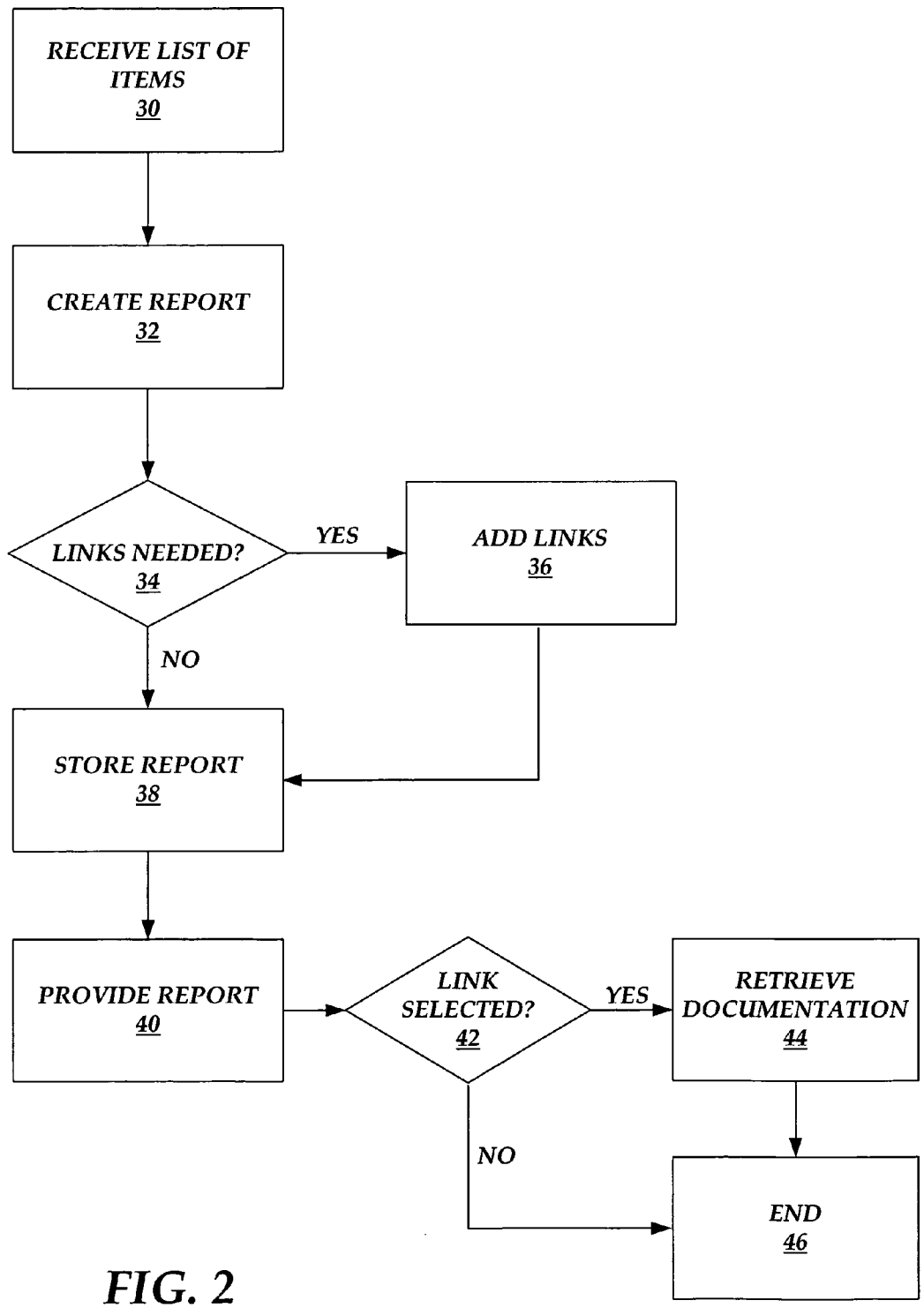
FIG. 2 is a diagram illustrating a process flow through the information retrieval system of FIG. 1 according to one embodiment of the present invention.

FIG. 2 is a diagram illustrating a process flow through the information retrieval system 10 of FIG. 1 according to one embodiment of the present invention. At step 30, a list of work items is received by the relay computer 14 from the work control module 12. The list of work items may be received, for example, on a daily basis or other periodic basis. At step 32, the relay computer 14 creates a report that may be useful to a user of the system 10. For example, the report may be a report used by a technician that lists work items for the technician to perform.

At step 34, the process determines whether a link or links to documentation need to be added to an item or items in the report. If a link or links need to be added, the link or links are added at step 36. After the link or links are added, or if there are no links to be added to the report, the report is stored in the file server 16 at step 38.

At step 40, a report is provided to a user of the system 10 if the user requests such a report. For example, a technician may retrieve a report at the beginning of a work day to determine what tasks are to be completed that day. At step 42, it is determined whether the user of the system 10 has selected a link to a source of documentation. If the user has selected a link, the process advances to step 44, where the documentation is retrieved from the document source 20. The process proceeds to an end when the user is finished browsing the report at step 46.

Figure 3:
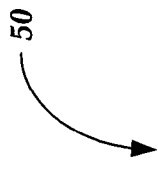
FIG. 3 is an example of a report generated by the relay computer of FIG. 1 according to one embodiment of the present invention.

FIG. 3 is an example of a report 50 generated by the relay computer 14 of FIG. 1 according to one embodiment of the present invention. The report 50 includes a trick field 52, which may be associated with, for example, a person that is to perform a task. That person may be, for example, the user of the system 10. The report 50 also includes a due date field 54 and a status field 56. The status field 56 may indicate, for example, that the trick is loaded or assigned. The report 50 includes an access service request field 58 and a work type field 60. A tracking field 62 in the report 50 includes links to documentary resources. The tracking field 62 may be populated by, for example, order numbers that are used by the work control module 12. When a user browsing the report 50 selects an item in the tracking field 62 by, for example, clicking a mouse over the item, a documentary resource is retrieved from the document source 20.

The report 50 includes a work ID field 64 that may be specific to, for example, a unique item of work in the work control module 12. An early start date field 66 and a loaded field 68 are included in the report 50. The loaded field 68 may indicate, for example, the number of times that a line, or work item was entered into a report. A jeopardy field 70 indicates whether a work item is in jeopardy of not being completed and a comments field 72 allows comments to be entered relating to a line item.

Figure 5:
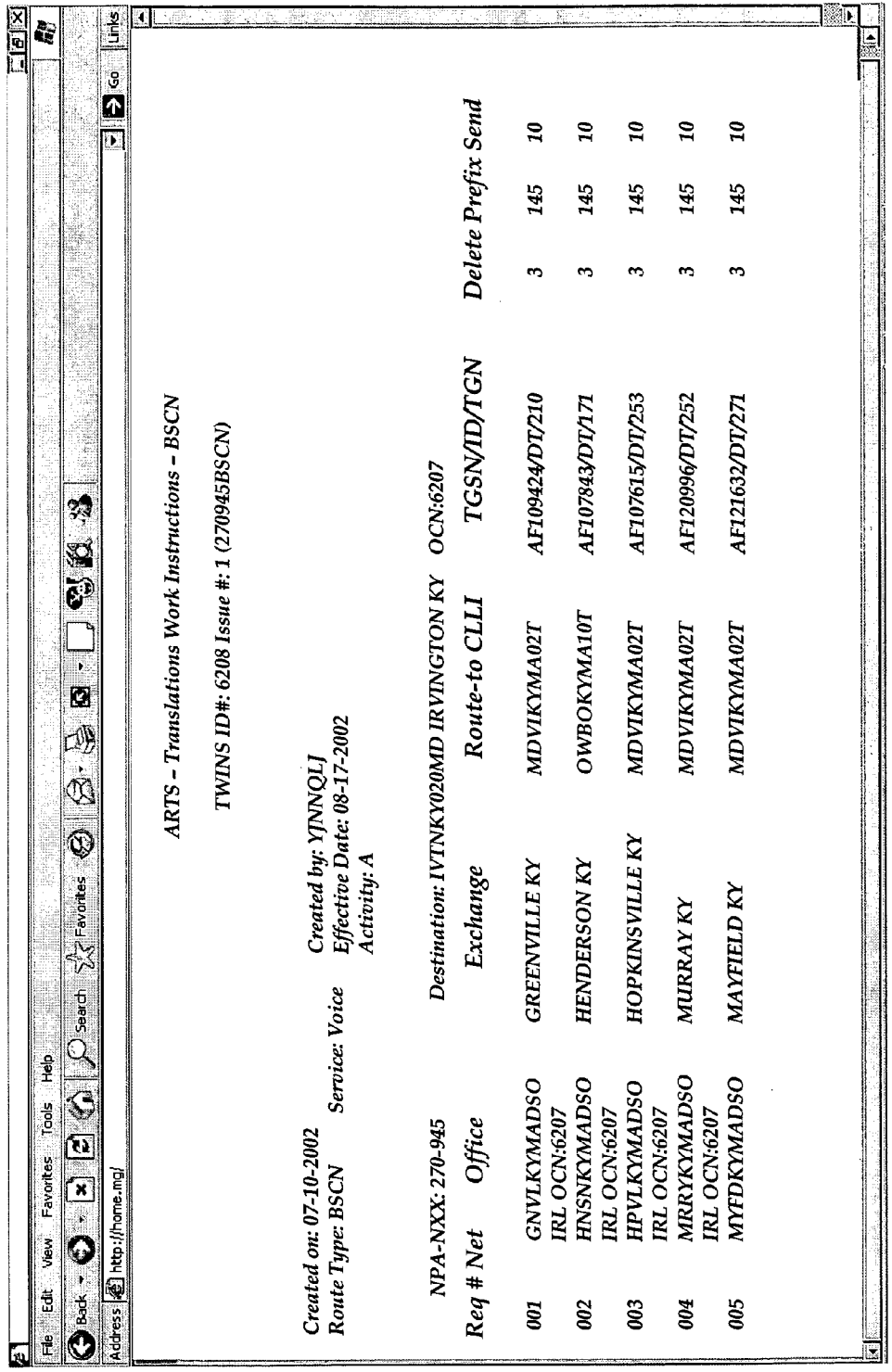
FIG. 5 is an example of documentation retrieved from an automated routing and trunking system according to one embodiment of the present invention.

FIG. 4 is an example of documentation 80 retrieved from a detailed trunk record system acting as a document source 20 according to one embodiment of the present invention. FIG. 5 is an example of documentation 82 retrieved from an automated routing and trunking system acting as a documentation source 20 according to one embodiment of the present intention. The documentation 80, 82 may be retrieved by, for example, selecting a link from a report that is stored in the file server 16.

In one embodiment of the present invention, the methods and modules described herein are embodied in, for example, computer software code that is coded in any suitable programming language such as, for example, visual basic, C, C++, or microcode. Such computer software code may be embodied in a computer readable medium or media such as, for example, a magnetic storage medium such as a floppy disk or an optical storage medium such as a CD-ROM.

While several embodiments of the invention have been described, it should be apparent, however, that various modifications, alterations and adaptations to those embodiments may occur to persons skilled in the art with the attainment of some or all of the advantages of the present invention. It is therefore intended to cover all such modifications, alterations and adaptations without departing from the scope and spirit of the present invention as defined by the appended claims.

What is claimed is:

1. A method implemented at least in part by a computing device, the method providing documentation from a source of telecommunications documentation, the method comprising:

receiving a list of telecommunications work items;

creating a report based on the list of work items;

determining if a link to a source of telecommunications documentation associated with a work item should be included in the report;

when it is determined that a link to a source of telecommunications documentation should be included, adding the link to the source of telecommunications documentation to the report, wherein the link is based on a tracking key, the source of telecommunications documentation comprising one of the following:

an automated routing and trunking system configured to store call routing and trunking information and an interconnection facility ordering system;

providing the report to a user;

retrieving the documentation from the source of telecommunications documentation when the user selects the link; and when it is not determined that a link to a source of telecommunications documentation should be included, returned to said receiving step.

2. The method of claim 1, wherein retrieving a list of telecommunications work items includes retrieving a list of telecommunications work items from a work control module.

3. The method of claim 2, wherein the work control module includes a work free administration system.

4. The method of claim 1, wherein the report includes a technician report.

5. The method of claim 1, further comprising storing the report in a file server.

6. The method of claim 1, wherein the link includes a uniform resource locator (URL) address.

7. The method of claim 1, wherein retrieving the documentation from the source of telecommunications documentation when the user selects the link includes retrieving the documentation from an automated routing and trunking system.

8. The method of claim 1, wherein retrieving the documentation from the source of telecommunications documentation when the user selects the link includes retrieving the documentation from an interconnection facility ordering system.

9. The method of claim 1, further comprising determining whether a link should be associated with a work item.

10. A system for providing documentation from a source of telecommunications documentation, comprising:
- a relay computer for:
  - receiving a list of work items, wherein each work item is associated with a task to be performed by a telecommunications worker;
  - creating a report;
  - determining if the report should have a link associated with a work item from the list of work items;
  - when it is determined that a link to a source of telecommunications documentation should be included, adding the link to the source of telecommunications documentation to the report, wherein the link is based on tracking key;
  - when it is not determined that a link to a source of telecommunications documentation should be included, returned to said receiving step;
- a source of telecommunications documentation in communication with the relay computer, the source of telecommunications documentation comprising one of the following:
  - an automated routing and trunking system configured to store call routing and trunking information and
  - an interconnection facility ordering system; and
- a user terminal in communication with the source of telecommunications documentation for enabling a user to select the link in order to retrieve documentation from the source of telecommunications documentation.

11. The system of claim 10, further comprising a work control module in communication with a relay computer.

12. The system of claim 11, wherein the work control module includes a work force administration system.

13. The system of claim 10, further comprising a file server in communication with the relay computer and the user terminal.

14. The system of claim 10, wherein the source of telecommunications documentation includes an automated routing and trunking system.

15. The system of claim 10, wherein the source of telecommunications documentation includes an interconnection facility ordering system.

16. The system of claim 13, wherein the file server includes a web server.

17. The system of claim 10, wherein the user terminal includes a workstation.

18. A computer readable storage medium having stored thereon instructions which, when executed by a processor, cause the processor to:
- receiving a list of telecommunications work items;
- creating a report based on the list of work items;
- determining if a link to a source of telecommunications documentation associated with a work item should be included in the report;
- when it is determined that a link to a source of telecommunications documentation should be included, adding the link to the source of telecommunications documentation to the report, wherein the link is based on a tracking keys in a data, wherein the report includes a link to a source of telecommunications documentation associated with a work item on the list, the source of telecommunications documentation comprising one of the following:
  - an automated routing and trunking system configured to store call routing and trunking information and
  - an interconnection facility ordering system;
- providing the report to a user;
- retrieving the documentation from the source of telecommunications documentation when the user selects the link; and
- when it is not determined that a link to a source of telecommunications documentation should be included, returned to said receiving step.

19. The computer readable medium of claim 18, having stored thereon instructions which cause the processor to determine whether a link should be associated with a work item.

20. The computer readable medium of claim 18, having stored thereon instructions which cause the processor to retrieve the documentation from one of an automated routing and trunking system and an interconnection facility ordering system.

* * * * *